US010112433B2

(12) United States Patent
Warwick

(10) Patent No.: US 10,112,433 B2
(45) Date of Patent: Oct. 30, 2018

(54) OPTICALLY VARIABLE TACTILE SECURITY FEATURE

(71) Applicant: Entrust Datacard Corporation, Shakopee, MN (US)

(72) Inventor: Dennis J. Warwick, Shakopee, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 0 days.

(21) Appl. No.: 15/349,489

(22) Filed: Nov. 11, 2016

(65) Prior Publication Data

US 2017/0136802 A1 May 18, 2017

Related U.S. Application Data

(60) Provisional application No. 62/255,077, filed on Nov. 13, 2015.

(51) Int. Cl.
*G06K 19/02* (2006.01)
*B42D 25/425* (2014.01)
(Continued)

(52) U.S. Cl.
CPC ............. *B42D 25/425* (2014.10); *B41M 3/14* (2013.01); *B41M 5/28* (2013.01); *B42D 25/21* (2014.10);
(Continued)

(58) Field of Classification Search
CPC ...... B42D 25/435; B42D 25/23; B42D 25/24; B42D 25/309; B42D 25/324
See application file for complete search history.

(56) References Cited

U.S. PATENT DOCUMENTS

2005/0247794 A1* 11/2005 Jones ..................... G06K 19/02 235/487
2006/0197337 A1* 9/2006 Merry .................... B42D 25/00 283/109

(Continued)

FOREIGN PATENT DOCUMENTS

EP 2322355 A1 5/2011
EP 2918424 A1 9/2015

(Continued)

OTHER PUBLICATIONS

International Search Report and Written Opinion of International Application No. PCT/US2016/061532, dated Feb. 20, 2017, 29 pages.

(Continued)

*Primary Examiner* — Shin H Kim
(74) *Attorney, Agent, or Firm* — Hamre, Schumann, Mueller & Larson, P.C.

(57) ABSTRACT

A security document and method of manufacturing the security document are disclosed. The security document includes a substrate including a laser reactive material and data. The security document also includes an optically variable tactile security feature formed in the laser reactive material, the optically variable tactile security feature including a non-tactile portion and a tactile portion. When viewed at a first viewing angle, the optically variable tactile security feature appears to be a first color, and at a second viewing angle different from the first viewing angle, the optically variable tactile security feature appears to be a second color.

22 Claims, 8 Drawing Sheets

(51) Int. Cl.

| | |
|---|---|
| ***B42D 25/21*** | (2014.01) |
| ***B42D 25/309*** | (2014.01) |
| ***B42D 25/41*** | (2014.01) |
| ***B41M 3/14*** | (2006.01) |
| ***B41M 5/28*** | (2006.01) |

(52) U.S. Cl.
CPC .......... *B42D 25/309* (2014.10); *B42D 25/41* (2014.10); *B41M 2205/24* (2013.01)

(56) References Cited

U.S. PATENT DOCUMENTS

| | | | | |
|---|---|---|---|---|
| 2007/0206249 | A1 | 9/2007 | Phillips et al. | |
| 2008/0296887 | A1* | 12/2008 | Baggenstos ............ | B42D 25/00 283/109 |
| 2009/0127344 | A1* | 5/2009 | Dostmann .............. | B42D 25/00 235/488 |
| 2010/0045024 | A1* | 2/2010 | Attner ..................... | B32B 29/06 283/72 |
| 2010/0258636 | A1 | 10/2010 | Theodossiou | |
| 2011/0031735 | A1* | 2/2011 | Gerigk ................... | B42D 25/29 283/70 |
| 2011/0057040 | A1 | 3/2011 | Jones et al. | |
| 2011/0156382 | A1* | 6/2011 | Uyttendaele ............. | B41M 3/14 283/91 |
| 2011/0200765 | A1* | 8/2011 | Uyttendaele ........... | B41M 5/267 428/29 |
| 2012/0091208 | A1* | 4/2012 | Michau ............... | B32B 37/0007 235/488 |
| 2013/0099473 | A1 | 4/2013 | Harrison et al. | |
| 2014/0227487 | A1* | 8/2014 | Warwick .................. | B41J 2/442 428/159 |

FOREIGN PATENT DOCUMENTS

| | | |
|---|---|---|
| WO | 2007118654 A2 | 10/2007 |
| WO | 2013185950 | 12/2013 |

OTHER PUBLICATIONS

The extended European search report issued in EP 16865081.0 dated Jul. 17, 2018.

* cited by examiner

50

55

OPTICALLY VARIABLE TACTILE SECURITY FEATURE

FIELD

This disclosure relates generally to a security feature on a substrate, such as a security document. More specifically, the embodiments relate to creating an optically variable tactile security feature on a security document using a laser.

BACKGROUND

A security document (e.g., a plastic card, passport, or the like) generally includes a substrate with data. A security document can, for example, include an identification card/certificate, a driver's license, a membership card, a financial card (e.g., a credit card, a debit card), a phone card, a health card, a passport, or the like. Data including, for example, a home address, a birthdate, a name, a portrait image, and/or other identifying information can be printed on the security document. The security document can also include a security feature (e.g., a hologram) to deter counterfeiters from modifying or reproducing the security document.

SUMMARY

In one embodiment, a security document is provided that includes a card or passport substrate having a laser reactive material, data, and an optically variable tactile security feature described herein. The security document may also include a magnetic stripe and/or a programmable chip that contains information related to the intended holder of the security document. In some embodiments, the data on the security document can include alphanumeric text or characters, images, or combinations thereof. In some embodiments, the optically variable tactile security feature can overlap a portion of the data. The optically variable tactile security feature can include a data portion and a non-data portion that surrounds, partially or completely, the data portion. In one embodiment, the data portion of the optically variable tactile security feature can be non-tactile and remain at or near the surface of the security document, while the non-data portion can be tactile relative to the data portion. The optically variable tactile security feature can exhibit optically variable properties (e.g., can exhibit an apparent color change depending on viewing angle).

In an embodiment, data such as text (e.g., regular text or inverted text (inverted text is white text surrounded by a black background)) can be added to a security document using a laser. In an embodiment the data can be added to the front of the security document. In an embodiment the data can be added to the back of the security document.

In an embodiment, an optically variable tactile security feature can be added to the security document in which the optically variable tactile security feature can overlap a portion of other data (e.g., a photo, etc.) applied to the document. This can, for example, make it more difficult to substitute or add information to the security document (e.g., counterfeit or otherwise reproduce the security document).

In an embodiment, data of the optically variable tactile security feature may remain at a surface of the security document, while an area surrounding that data of the security feature is raised above the surface of the security document. In another embodiment, data of the optically variable tactile security feature may be raised above the surface of the security document, while the area surrounding the raised data of the optically variable tactile security feature remains at the surface of the security document. In an embodiment, having the data of the optically variable tactile security feature remain at the surface of the document while the surrounding area is raised may be preferred.

A security document can be made of any suitable material that supports the formation of optically variable tactile security feature described herein. In an embodiment, the security document includes a substrate (e.g., plastic card stock or a passport page) having a laser reactive (LR) material at the surface. In an embodiment, the LR material is commercially available under the trade name MAKROFOL® by Bayer Material Science LLC. In an embodiment, the LR material can be between at or about 50 μm thick and at or about 200 μm thick. In an embodiment, the LR material can be transparent. The thickness of the LR material may determine a darkness level of the optically variable tactile security feature and how high the tactile portions of the optically variable tactile security feature are raised.

A security document is also disclosed. The security document includes a substrate including a laser reactive material and data. The security document also includes an optically variable tactile security feature formed in the laser reactive material, the optically variable tactile security feature including a non-tactile portion and a tactile portion. When viewed at a first viewing angle, the optically variable tactile security feature appears to be a first color, and at a second viewing angle different from the first viewing angle, the optically variable tactile security feature appears to be a second color.

A method of producing an optically variable tactile security feature on a security document is also disclosed. The security document includes a substrate having a laser reactive material. The method includes controlling a laser to selectively mark the security document to form a first marked area in the laser reactive material. The method further includes controlling the laser to selectively mark the security document to form a second marked area in the laser reactive material. The first marked area is tactile and the second marked area is non-tactile.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

Figure 1A:
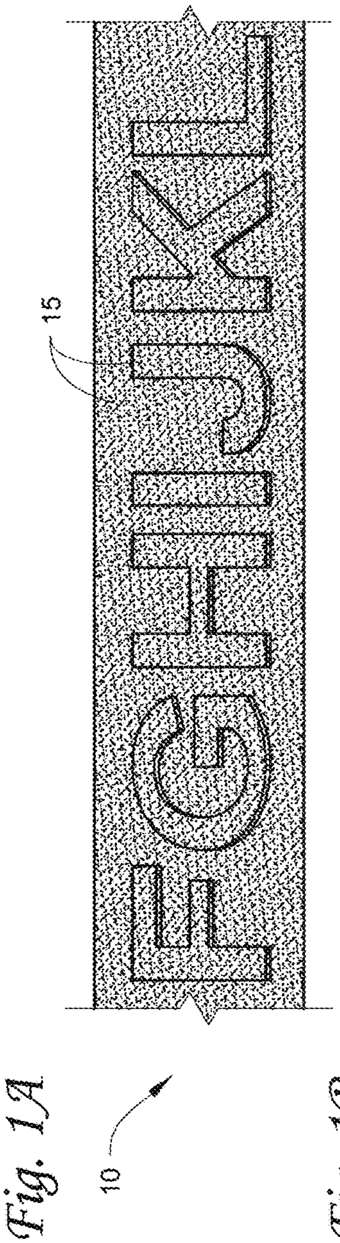
FIGS. 1A-1C show example text including an optically variable tactile security feature on a security document when viewed at different incident light conditions, according to an embodiment.

Security documents described herein can include both tactile and non-tactile portions. In one embodiment, non-tactile portions may visually appear to be generally white (e.g., not laser marked) and tactile portions may visually appear to be generally black (e.g., laser marked) when viewed with the naked eye (e.g., without a microscope or optical magnifier). Laser marking can result in tactile and/or non-tactile portions of the security document being produced. In another embodiment, an optically variable tactile security feature, as described herein, can provide both non-tactile and tactile portions where both the non-tactile and tactile portions may visually appear to be generally black to the naked eye. The optically variable tactile security feature, as described herein, can also exhibit an apparent visual color change depending on the viewing angle (e.g., white appearance from one or more viewing angles and black appearance from one or more different viewing angles). When viewing the optically variable tactile security feature with an optical magnifier, such as a loop or a microscope, characters in a line of text may appear to be raised from the security document, even though they are actually depressed relative to the tactile portions of the security document (i.e., they are relatively even with a surface of the security document that is not tactile). This can make it more difficult to correctly duplicate the text (e.g., the attempted duplicate could include raised text, when in fact the authentic document includes text that is not raised). In some embodiments, special lighting may be necessary in order to correctly identify an authentic document described herein.

The optically variable tactile security feature can include any type of laser marked data (photo, text, logo, etc.). In one embodiment, the optically variable tactile security feature may include a line of text where the text is non-tactile and the area surrounding the text is tactile.

A security document can include any one of a variety of plastic cards, or a passport page that one may wish to protect the authenticity of using a security feature. Examples of security documents include, but are not limited to, a financial card (e.g., a credit card, a debit card, or the like), a driver's license, an identification card/certificate, a page of a passport, or the like.

Types of data on a security document that can be used to form the optically variable tactile security feature can include, for example, alphanumeric text or characters, images, or combinations thereof. For example, a security document can include variable data (e.g., variable from one security document to the next) that is personal to an intended holder of the security document. Examples of variable data include, but are not limited to, a home address, a name, a portrait image (e.g., a photograph) of the intended holder of the security document, and other identifying information. Variable data can similarly be referred to as personalization information. The variable data can be personal to an individual for whom the security document is printed, randomly generated, related to the card issuer, or the like. The data can also include fixed or non-variable data that may appear on multiple security documents and is not personal to the intended holder of the security document. Examples of non-variable data include, but are not limited to, a government entity name, a name of the document issuer, a company logo, a general security logo, or the like.

Data can be applied to a security document by laser marking, printing (e.g., retransfer printing or direct to card printing), or a combination thereof. Laser marking generally includes darkening of a portion of the security document by a laser. The results of the laser marking can be non-tactile or tactile.

Security documents generally may also include one or more additional security features such as, but not limited to, holograms, micro printing, or the like. The one or more additional security features are designed to prevent counterfeiting or modification of the security documents. Some security features can be undetectable (e.g. not visible to the naked eye) unless viewed under a microscope, a special light, or the like. For example, a security feature may only be detectable when the security document is viewed under a black light.

An image is not limited to a portrait image. Examples of images include, but are not limited to, one or more partial or complete portrait images of the intended document holder, one or more alphanumeric characters, one or more symbols, one or more logos, one or more phrases, or combinations thereof.

As used throughout the description and claims, the word non-tactile, non-tactile portion or the like encompasses a portion of the optically variable tactile security feature that may feel generally smooth to the touch.

As used throughout the description and claims, the word tactile, tactile portion or the like encompasses a portion of the optically variable tactile security feature that can be perceived via touch for example using one or more fingers.

A color, as used herein, can include, but is not limited to, white and black, as well as relative shades between white and black.

As described further below, upon application of a laser beam to the security document, a laser reactive (LR) material on or in the security document reacts to the laser beam. A power level of the laser beam can determine how the laser reactive material reacts and thus determine the appearance of the optically variable tactile security feature. The laser reactive material contacted by the laser beam may become darker, the laser reactive material contacted by the laser beam may become darker and become raised up above the surrounding surface of the security document, the laser beam can contact the laser reactive material at one power level to create a portion of the optically variable tactile security feature having a first shade of color while the laser beam can contact the laser reactive material at a second power level to create another portion of the optically variable tactile security feature having a different shade of color that can be lighter or darker than the first shade, etc. Application of the laser beam to an area that was already marked can cause the area to become raised. Many variations are possible.

Figure 1B:
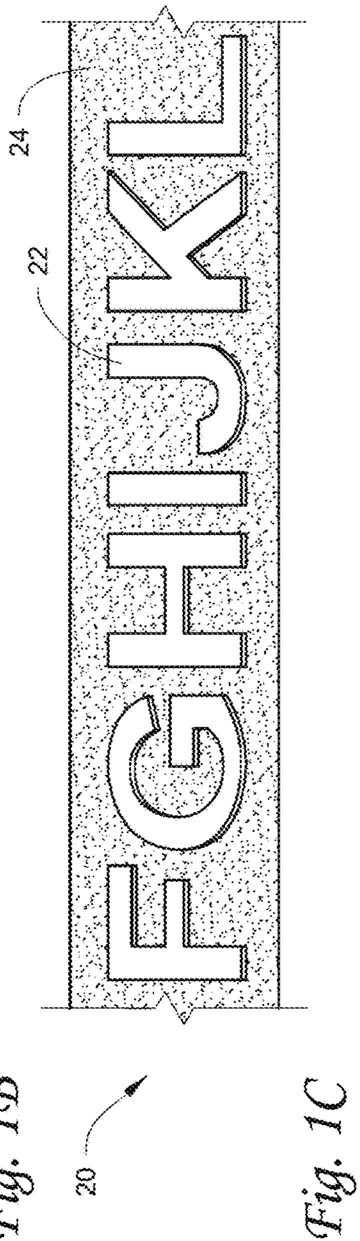
Figure 1C:
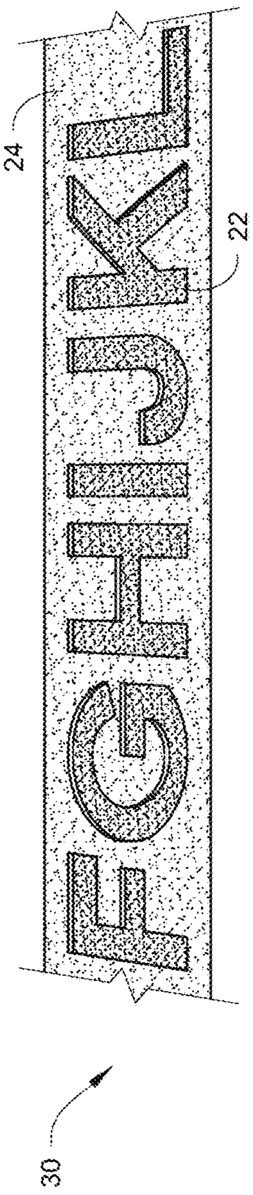

FIGS. 1A-1C show an example of text including an optically variable tactile security feature on a security document when viewed with the naked eye at different incident light conditions, according to an embodiment. FIGS. 1A-1C show the same text element on a security document at different lighting conditions. Note that the characters of the text visually appear to be raised, but in fact are depressed compared to the adjacent areas (i.e., the adjacent areas are raised relative to the characters of the text).

The row 10 of text in FIG. 1A shows light, for example white light, directed straight toward the surface and coming from multiple directions. With the exception of a few highlights, the area 15 is stippled in appearance to represent a relatively darker color (e.g., black) appearance. The row 10 in FIG. 1A generally illustrates what would be seen at a "first look" viewing condition typical of the "first look" at the security document.

The row 20 of text in FIG. 1B shows light, for example white light, from a single source reflected from the surface of the security document. The characters 22 appear white (no stippling) against a darker (stippled) background area 24. In general, the characters 22 in FIG. 1B appear white because they have a relatively smooth surface and reflect incident light. Visually, the background area 24 appears darker to a viewer because of, for example, camera and lighting conditions associated with capturing the image.

The row 30 of text in FIG. 1C shows a different angle of reflected light from the surface of the security document. The characters 22 appear relatively darker (a first shade of stippling) against a lighter background area 24 (a second shade of stippling).

Figure 9:
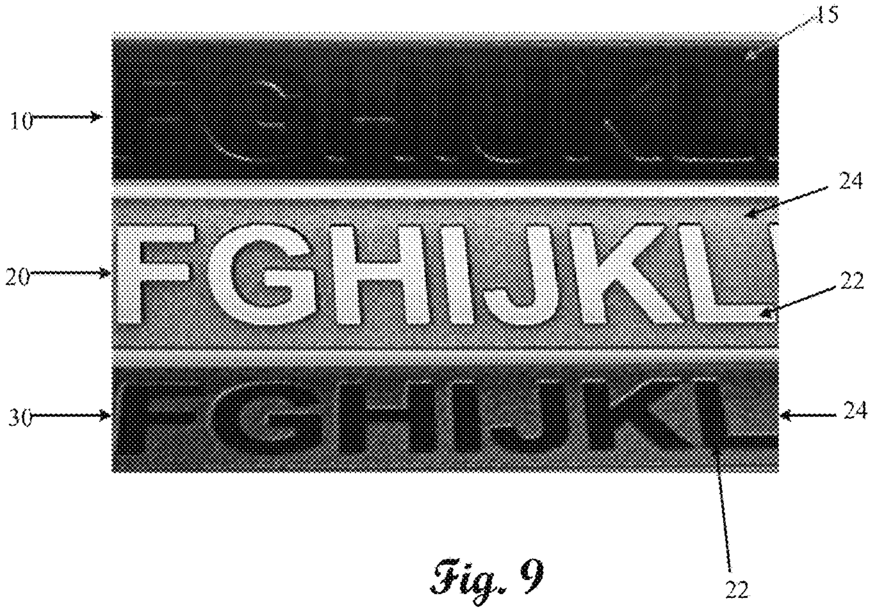
FIG. 9 shows example text including an optically variable tactile security feature on a security document when viewed at different incident light conditions, according to an embodiment.

The stippling used to show the variations in appearance is an example. It will be appreciated that the relative appearance of the rows 10-30 of text may be varied. Another example is shown in FIG. 9. FIG. 9 includes the rows 10-30 of text. The variations in appearance include a different relative appearance than illustrated in FIGS. 1A-1C. It will be appreciated that the relative appearance of the rows 10-30 may vary beyond these embodiments in accordance with the principles described in this specification.

Figure 2B:
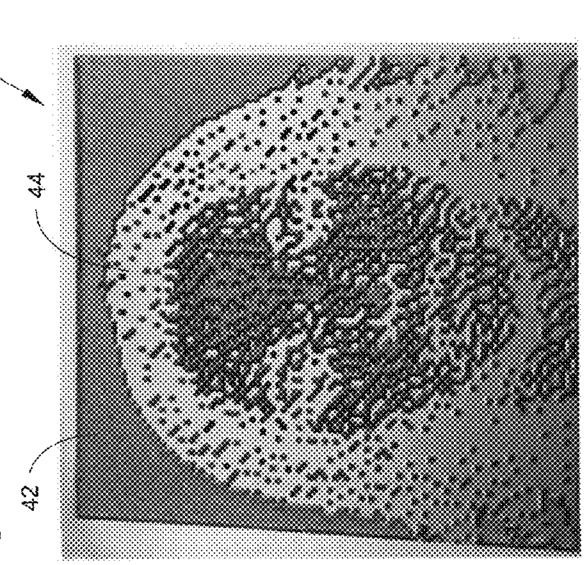
FIGS. 2A-2B show an example portrait including an optically variable tactile security feature on a security document when viewed at different incident light conditions, according to an embodiment.
Figure 2A:
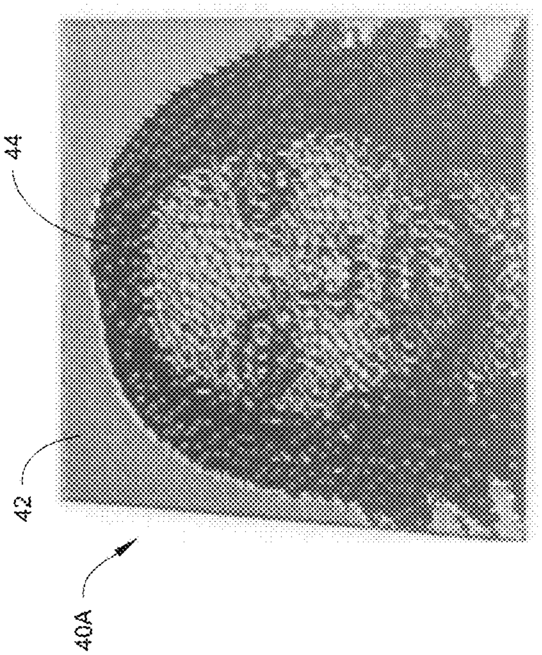

FIGS. 2A-2B show a portrait image forming an optically variable tactile security feature on a security document when viewed with the naked eye at different incident light conditions, according to an embodiment. FIGS. 2A-2B show similar effects as described with reference to FIGS. 1A-1C. The same portrait is shown in FIGS. 2A-2B under two different lighting conditions 40A, 40B. In general, it may be relatively easier to determine which portions of the optically variable tactile security feature are raised relative to the surface of the security document and which are even with the surface of the security document (e.g., depressed relative to the raised portion) when the security feature is a portrait image. The appearance of the portrait image when viewed under the different lighting conditions 40A, 40B can be different. In view 40A of the portrait image (FIG. 2A), the hair area 44 of the portrait image appears to be black, while in view 40B (FIG. 2B) of the portrait image, the hair area 44 appears to be white or a lighter shade of gray. Although the hair area 44 of the portrait image appears to be raised in the view 40A, as shown in the view 40B the hair area 44 is actually not raised. Similarly, although the background area 42 in the view 40A appears to not be raised, as shown in the view 40B, the background area 42 is raised.

In an embodiment, which portions of the optically variable tactile security feature are raised (e.g., tactile) and which portions are not raised (e.g., non-tactile) can be relatively difficult to determine. However, because a portrait image can have a relatively more irregular arrangement of tactile and non-tactile portions, it may be relatively easier to determine than, for example, text which generally includes a relatively more regular arrangement of tactile and non-tactile portions.

Figure 3:
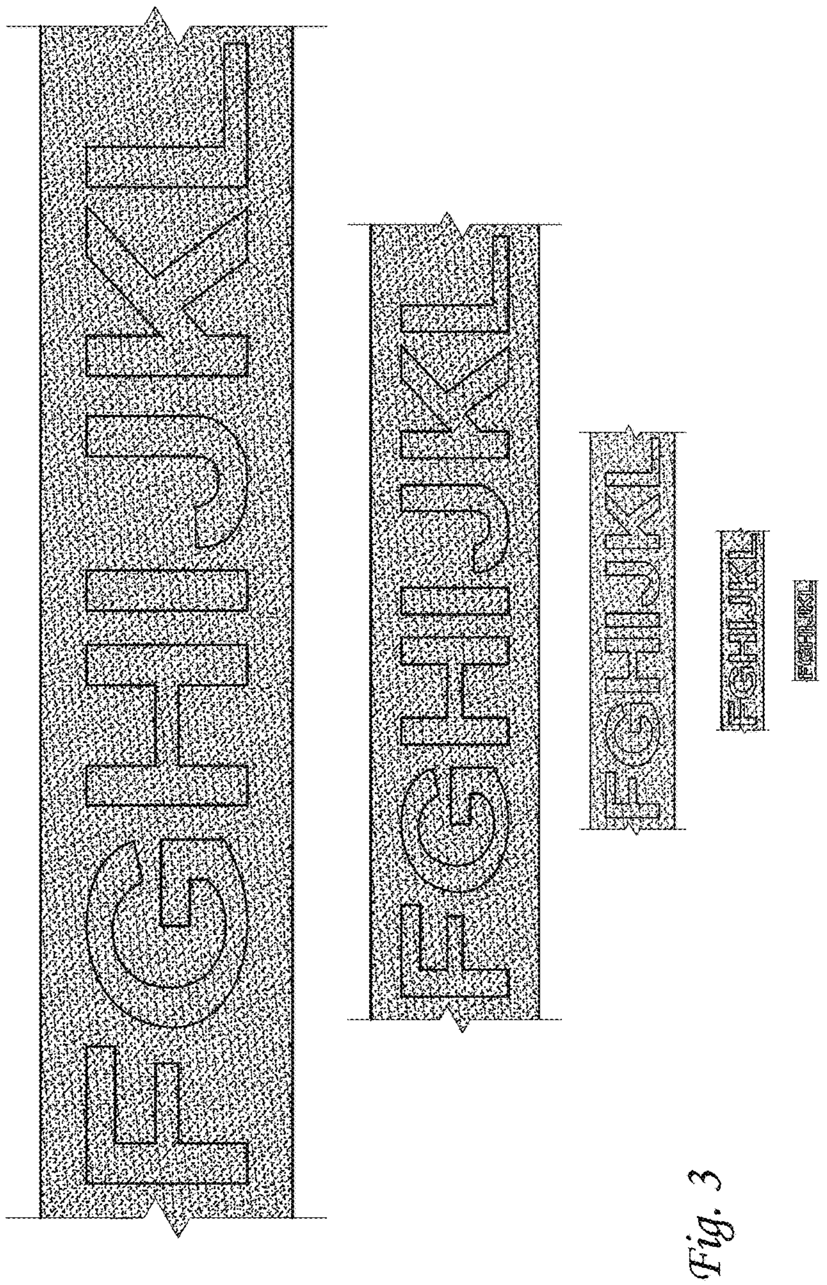
FIG. 3 shows example text including an optionally variable tactile security feature on a security document, according to an embodiment.

FIG. 3 shows various text including an optically variable tactile security feature on a security document, according to an embodiment. The rows of text decrease in font size (e.g., from 12 pt, to 8 pt, to 4 pt, to 2 pt) from top to bottom in the figure.

Figure 4:
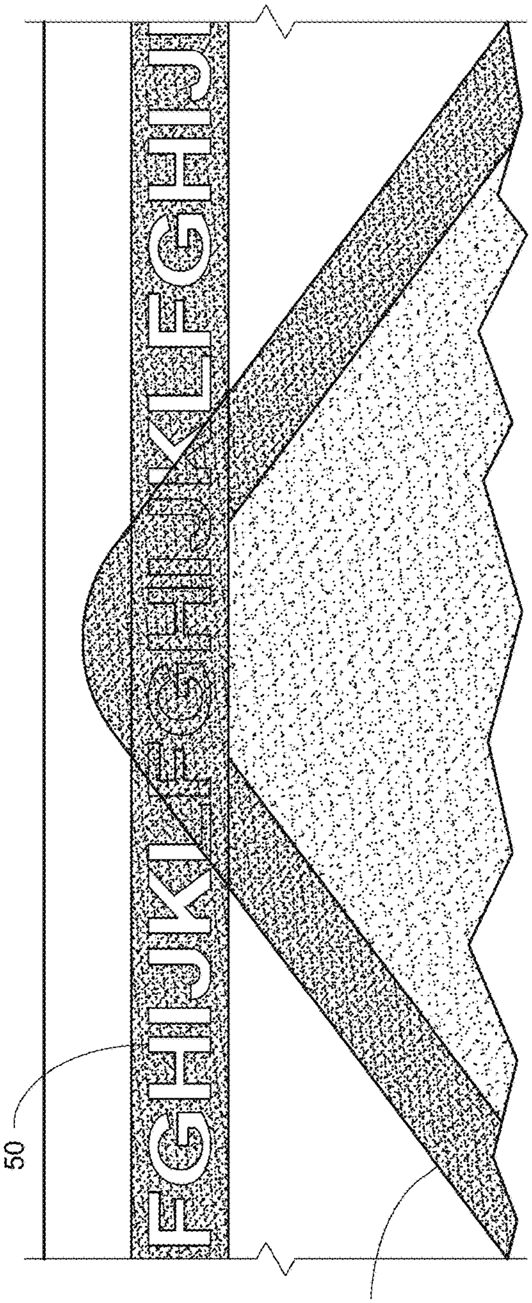
FIG. 4 shows a portion of text including an optically variable tactile security feature overlapping with a portion of a photo, according to an embodiment.

FIG. 4 shows a portion of text 50 including an optically variable tactile security feature overlapping with a portion of a portrait image 55, according to an embodiment. The text 50 in FIG. 4 is a line of inverted text crossing a portion of the portrait image 55. When viewed without magnification, the text 50 appears to be covered by the portrait image 55, as can be seen by the stippling of the text 50 in the overlapping region, which text 50 is not stippled in the non-overlapping region. FIG. 4 illustrates that the optically variable tactile security feature overlapping a portion of other data (e.g., a portion of portrait image 55 in the illustrated embodiment, etc.) may depend on content (e.g., color) of the other data. For example, as shown in FIG. 4, if there is no black on the portrait image 55, there will be no tactility to the text 50 in the overlapping portion.

Figure 5:
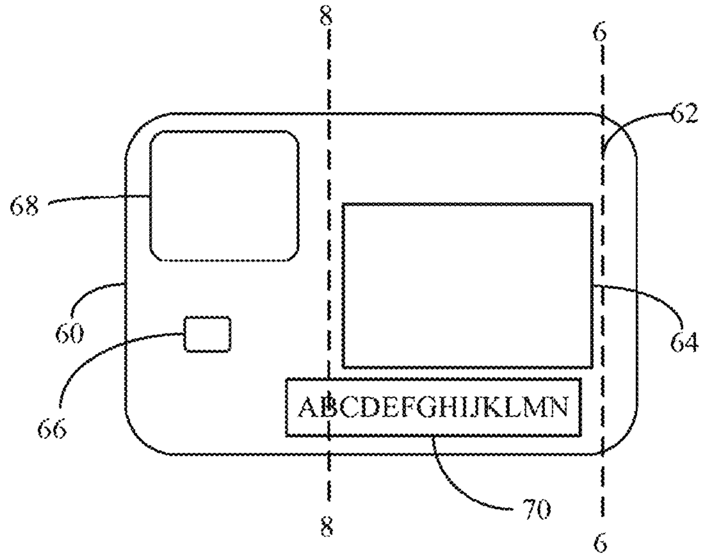
FIG. 5 shows a security document, according to an embodiment.

FIG. 5 shows a security document 60, according to an embodiment. A surface 62 of the security document 60 is shown. The surface 62 can be representative of either a front surface or a back surface of the security document 60. In this example, the security document 62 is generally rectangular in construction with rounded corners. The illustrated security document 60 may be representative of, for example, a financial card (e.g., a credit card, a debit card, or the like), a driver's license, an identification card/certificate, or the like. The surface 62 can include first data 64, a programmable chip 66 (e.g., an integrated circuit chip), second data 68, and an optically variable tactile security feature 70. It will be appreciated that the surface 62 can include additional features such as one or more additional security features, additional data, or the like. Further, the layout of the security document 60 is an example, and the various features shown can be moved to different locations on the surface 62, or could be moved to a surface opposite the surface 62.

Figure 8:
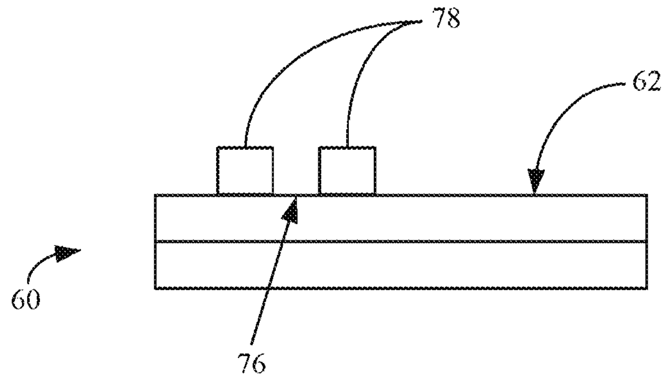
FIG. 8 is a cross-sectional view of the security document of FIG. 5 taken along line 8-8 of FIG. 5 showing tactile and non-tactile portions of the optically variable tactile security feature, according to an embodiment.

FIG. 8 is a cross-sectional view of the security document 60 taken along line 8-8 of FIG. 5 through the text character B. In this example, the text characters of the optically variable tactile security feature 70 are non-tactile and substantially level with the surface 62 of the security document, while the areas of the optically variable tactile security feature 70 surrounding the text characters, the areas between the text characters, and the areas within the text characters (for example within the empty space of the letter B) are tactile and raised above the surface 62 and the text characters. In FIG. 8, the stem of the character B is depicted at area 76 as being flat and level with the surface 62, while the tactile areas of the border around the character B are indicated at 78 as being raised above the surrounding surface 62 and the area 76. The illustrated embodiment is an example. It is to be appreciated that a height, location, geometry, etc. of the tactile areas 78 and the areas 76 may vary.

Figure 6:
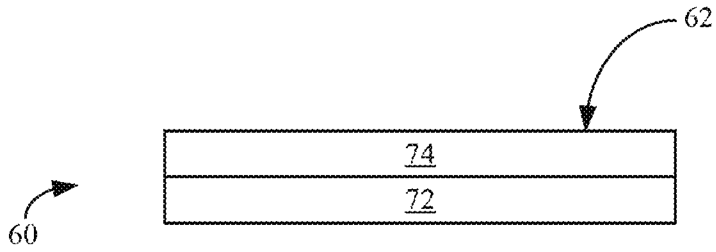
FIG. 6 shows a cross-sectional view of the security document of FIG. 5 taken along line 6-6, according to an embodiment.

FIG. 6 is a schematic sectional view of the security document 60 of FIG. 5, according to an embodiment. The security document 60 includes a substrate 72 and a laser reactive material 74 disposed on the substrate 72. As shown, the substrate 72 and the laser reactive material 74 are two layers of the security document 60. The substrate 72 can be a first material and the laser reactive material 74 can be a second material that is applied to the substrate 72. It will be appreciated that the laser reactive material 74 and the substrate 72 could alternatively be a composite material in which the material forming the laser reactive material 74 and the material forming the substrate 72 are blended together rather than being separately identifiable layers. In addition, there can be one or more additional layers in the security document 60 in addition to the substrate 72 and the laser reactive material 74.

Figure 7:
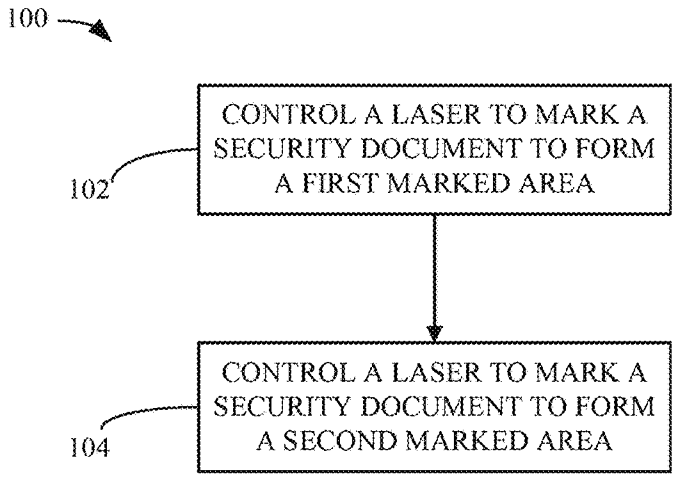
FIG. 7 is a flowchart of a method for producing an optically variable tactile security feature on a security document, according to an embodiment.

FIG. 7 is a flowchart of a method 100 for producing the security document 60, according to an embodiment. The method 100 includes controlling a laser to selectively mark the security document 60 to form a first marked area at 102. At 104, the laser is controlled to selectively mark the security document to form a second marked area. The second marked area can be relatively larger than the first marked area.

In an embodiment, the method 100 can include two passes over an area with a laser. The first pass (e.g., 102) can be used to make the data (e.g., text, etc.). For example, when the data is text and the text is inverted (e.g., white text on a black background), the first pass can result in white text having a black background. The second pass (e.g., 104) covers an entire area (e.g., text as well as an area surrounding the text, etc.) so that previously marked areas become tactile and the previously unmarked areas become black but remain non-tactile. In the embodiment having inverted text, the previously marked area is the background area surrounding the text and the previously unmarked area is the text. In an embodiment, covering the entire area can include marking an area that is relatively larger than the text. For example, in an embodiment, covering the entire area can include marking a rectangle that is relatively larger than the text which was marked in the first pass. It will be appreciated that marking a rectangle is intended as an example, and that other geometries can be marked within the scope of the disclosure herein.

As a result of the second pass, the areas that were previously marked (e.g., areas surrounding the text) will become tactile and all previously unmarked areas (e.g., the text) will become black, but will remain non-tactile. The previously marked areas become tactile because they were previously marked, and with the second pass, the security document absorbs additional laser energy, becoming tactile. The non-tactile areas reflect light and appear white when the incident light is at the correct angle when viewed with the naked eye.

In an embodiment, the laser may be set to a relatively lower energy level in the second pass. This may be dependent on a material being marked. That is, different laser reactive materials may require different laser settings.

In an embodiment, the method 100 can include a single pass (e.g., 102 and 104) over an area with a laser. In such an embodiment, tactile areas can be created by increasing an amount of laser energy so that the laser energy applied to the tactile areas is relatively greater than the laser energy applied to the non-tactile areas.

The terminology used in this specification is intended to describe particular embodiments and is not intended to be limiting. The terms “a,” “an,” and “the” include the plural forms as well, unless clearly indicated otherwise. The terms “comprises” and/or “comprising,” when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A security document, comprising:

a substrate including a laser reactive material;

a first laser marked area of the substrate that is visible to the naked eye and appears generally black to the naked eye;

a second marked area of the substrate that is visible to the naked eye and appears generally black to the naked eye;

an overlapping area in which a region of the first laser marked area and a region of the second laser marked area overlap, wherein the overlapping area is tactile;

a non-overlapping area in which a region of the first laser marked area and a region of the second laser marked area do not overlap, wherein the non-overlapping area is non-tactile, wherein when viewed at a first viewing angle, the non-overlapping area reflects light and visually appears to be a first shade of color, and at a second viewing angle different from the first viewing angle, the non-overlapping area reflects light and visually appears to be a second shade of color that is different from the first shade of color.

2. The security document according to claim 1, wherein the laser reactive material is a laser reactive film disposed on the substrate.

3. The security document according to claim 2, wherein the laser reactive film has a thickness from about 50 μm thick to about 200 μm thick.

4. The security document according to claim 1, wherein the security document is one of a plastic card and a passport.

5. The security document according to claim 1, wherein the first laser marked area is produced using a laser at a first power level, and the second laser marked area is produced using a laser at a second power level different than the first power level.

6. The security document according to claim 1, wherein the substrate further includes data that includes alphanumeric text or characters, images, or combinations thereof, and the data is variable or non-variable.

7. The security document according to claim 1, wherein the first laser marked area and the second laser marked area form a line of text, the text is the non-overlapping area and an area surrounding the text is the overlapping area.

8. The security document according to claim 1, further comprising one or more additional security features on the substrate designed to prevent counterfeiting or modification of the security document.

9. The security document according to claim 6, wherein the first laser marked area or the second laser marked area overlaps a portion of the data.

10. A method of producing an optically variable tactile security feature on a security document that includes a substrate having a laser reactive material, comprising:

in a first laser marking pass, selectively marking the security document using a laser to form a first laser marked area that is visible to the naked eye and appears generally black to the naked eye in the laser reactive material; and in a second laser marking pass, selectively marking the security document using a laser to form a second laser marked area that is visible to the naked eye and appears generally black to the naked eye in the laser reactive material, wherein the first laser marked area is tactile in an overlapping area in which the first laser marked area and the second laser marked area overlap, and the second laser marked area is non-tactile in a non-overlapping area in which the first laser marked area and the second laser marked area do not overlap.

11. The method according to claim 10, comprising forming the first laser marked area and the second laser marked area using the same laser.

12. The method according to claim 11, wherein the first laser marking pass includes setting the laser at a first energy level and the second laser marking pass includes setting the laser at a second energy level, the first and second energy levels being different from one another.

13. The method according to claim 12, wherein the first energy level is greater than the second energy level.

14. The method according to claim 10, comprising forming the first laser marked area while the laser is at a first energy level and forming the second laser marked area while the laser is at a second energy level, where the first energy level is greater than the second energy level.

15. The method according to claim 10, wherein the first laser marked area includes data.

16. The method according to claim 10, wherein the second laser marked area includes data.

17. The method according to claim 10, wherein the security document includes a line of inverted text, the inverted text being the non-overlapping area, and the overlapping area surrounds the inverted text.

18. The method according to claim 10, wherein the second laser marked area is larger than the first laser marked area.

19. The method according to claim 10, wherein the security document is one of a plastic card and a passport.

20. The method according to claim 10, wherein the overlapping area is raised above a surface of the security document, and the non-overlapping area is level with the surface.

21. The security document according to claim 1, wherein the overlapping area is raised from a surface of the security document, and the non-overlapping area is level with the surface of the security document.

22. The security document according to claim 1, wherein the second laser marked area is relatively larger than the first laser marked area.

* * * * *